US010372773B2

(12) United States Patent
Raheja et al.

(10) Patent No.: US 10,372,773 B2
(45) Date of Patent: Aug. 6, 2019

(54) SYSTEM AND METHOD FOR PROVIDING RECOMMENDED MAPPINGS FOR USE BY A MAPPER IN AN INTEGRATION CLOUD SERVICE DESIGN TIME

(71) Applicant: Oracle International Corporation, Redwood Shores, CA (US)

(72) Inventors: Rajesh Raheja, Cupertino, CA (US); Viresh Amin, Sunnyvale, CA (US); Virupaksha Vajragiri, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 276 days.

(21) Appl. No.: 15/171,900

(22) Filed: Jun. 2, 2016

(65) Prior Publication Data
US 2016/0357826 A1 Dec. 8, 2016

Related U.S. Application Data

(60) Provisional application No. 62/171,782, filed on Jun. 5, 2015.

(51) Int. Cl.
G06F 16/9537 (2019.01)
(52) U.S. Cl.
CPC .............. G06F 16/9537 (2019.01)
(58) Field of Classification Search
CPC ............. G06F 17/3087; G06F 16/9537
See application file for complete search history.

(56) References Cited

U.S. PATENT DOCUMENTS 6,256,676 B1 * 7/2001 Taylor .............. G06F 9/465
709/246
7,257,818 B2 * 8/2007 Foerg .............. G06Q 30/06
719/310

(Continued)

FOREIGN PATENT DOCUMENTS

WO 2005114393 1/2005

OTHER PUBLICATIONS

European Patent Office, International Searching Authority, International Search Report and Written Opinion dated Sep. 8, 2016 for International Application No. PCT/US2016/035743, 11 Pages.

(Continued)

Primary Examiner — Jay A Morrison
(74) Attorney, Agent, or Firm — Tucker Ellis LLP

(57) ABSTRACT

In accordance with an embodiment, described herein is a system and method for providing recommended mappings to a mapper for use in designing an integration flow in a design time of a cloud-based integration service. A database can store mapping records from a plurality of sources, and mapping records inferred from the extracted mapping records. Each mapping record in the database can be associated with a rating generated by a ranking engine. A recommendation engine can be invoked to retrieve one or more mapping records from the database and an auto suggestion engine, for graphical display in the mapper. The integration flow can be published, and mapping information therein can be parsed by the recommendation engine into one or more mapping records, which are persisted into the database to update the mapping records in the database.

20 Claims, 10 Drawing Sheets

(56) References Cited

U.S. PATENT DOCUMENTS

| | | |
|---|---|---|
| 8,788,931 B1 | 7/2014 | Chen |
| 9,367,595 B1 | 6/2016 | Malks |
| 9,882,844 B2 * | 1/2018 | Granshaw ............... H04L 51/04 |
| 2002/0116531 A1 | 8/2002 | Chu |
| 2004/0044729 A1 * | 3/2004 | Foerg ..................... G06Q 30/06 |
| | | 709/203 |
| 2007/0245013 A1 | 10/2007 | Saraswathy |
| 2008/0034010 A1 * | 2/2008 | Quan ................... G06F 17/2247 |
| 2009/0125833 A1 | 5/2009 | Abernethy |
| 2010/0042670 A1 | 2/2010 | Kamalakantha |
| 2010/0256994 A1 * | 10/2010 | Eisenberger ........... G06Q 10/10 |
| | | 705/3 |
| 2012/0030275 A1 | 2/2012 | Boller |
| 2012/0290323 A1 | 11/2012 | Barsoum |
| 2013/0167109 A1 | 6/2013 | Nucci |
| 2013/0204884 A1 * | 8/2013 | Stewart ................. G06Q 10/06 |
| | | 707/755 |
| 2014/0100922 A1 | 4/2014 | Aycock |
| 2014/0129265 A1 | 5/2014 | Arena |
| 2014/0334304 A1 * | 11/2014 | Zang ................... H04L 47/2441 |
| | | 370/235 |
| 2015/0082196 A1 | 3/2015 | Berger |
| 2015/0188973 A1 | 7/2015 | Kacmarcik |
| 2016/0182309 A1 | 6/2016 | Maturana |
| 2016/0196532 A1 | 7/2016 | De |
| 2016/0359689 A1 | 12/2016 | Herreria |
| 2018/0173846 A1 | 6/2018 | Sigurjonsson |

OTHER PUBLICATIONS

United States Patent and Trademark Office, Notice of Allowance and Fee(s) Due dated Mar. 21, 2019 for U.S. Appl. No. 15/171,894, 11 Pages.

* cited by examiner

SYSTEM AND METHOD FOR PROVIDING RECOMMENDED MAPPINGS FOR USE BY A MAPPER IN AN INTEGRATION CLOUD SERVICE DESIGN TIME

CLAIM OF PRIORITY

This application claims the benefit of priority to U.S. Provisional Application titled "SYSTEM AND METHOD FOR CREATING MAPPINGS FOR USE BY A RECOMMENDATION ENGINE TO GENERATE RECOMMENDED MAPPINGS", Application No. 62/171,782, filed Jun. 5, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for providing recommended mappings in a design time of a cloud-based integration service.

BACKGROUND

The rapid shift from on-premises applications to a hybrid mix of Software-as-a-Service (SaaS) and on-premises applications has introduced challenges for companies attempting to simplify enterprise application integration. Integration platform as a service (iPaaS) platforms can provide a set of cloud-based tools to address these challenges. An iPaaS platform can provide a design time for developers to design integration flows, and to map data objects of different formats between source applications and target applications.

SUMMARY

In accordance with an embodiment, described herein is a system and method for providing recommended mappings to a mapper for use in designing an integration flow in a design time of a cloud-based integration service. A database can store mapping records from a plurality of sources, and mapping records inferred from the extracted mapping records. Each mapping record in the database can be associated with a rating generated by a ranking engine. A recommendation engine can be invoked to retrieve one or more mapping records from the database and an auto suggestion engine, for graphical display in the mapper. The integration flow can be published, and mapping information therein can be parsed by the recommendation engine into one or more mapping records, which are persisted into the database to update the mapping records in the database.

DETAILED DESCRIPTION

Integration platform as a service, for example, Oracle Integration Cloud Service (ICS) can provide a cloud-based platform for building and deploying integrations flows that connect applications residing in the cloud or on-premises.

A cloud-based integration platform can be used to design and execute an integration flow which maps data from a source application to a target application.

Due to the complexity of enterprise applications, data mapping from one application to another can be complex, time-consuming, and error-prone.

In accordance with an embodiment, described herein is a system and method for providing recommended mappings to a mapper for, use in designing an integration flow in an integration cloud service (ICS) design time. A database can store mapping records from a plurality of sources, and mapping records inferred from the extracted mapping records. Each mapping record in the database can be associated with a rating generated by a ranking engine. A recommendation engine can be invoked to retrieve one or more mapping records from the database and an auto suggestion engine, for graphical display in the mapper. The integration flow can be published, and mapping information therein can be parsed by the recommendation engine into one or more mapping records, which are persisted into the database to update the mapping records in the database.

Figure 1:
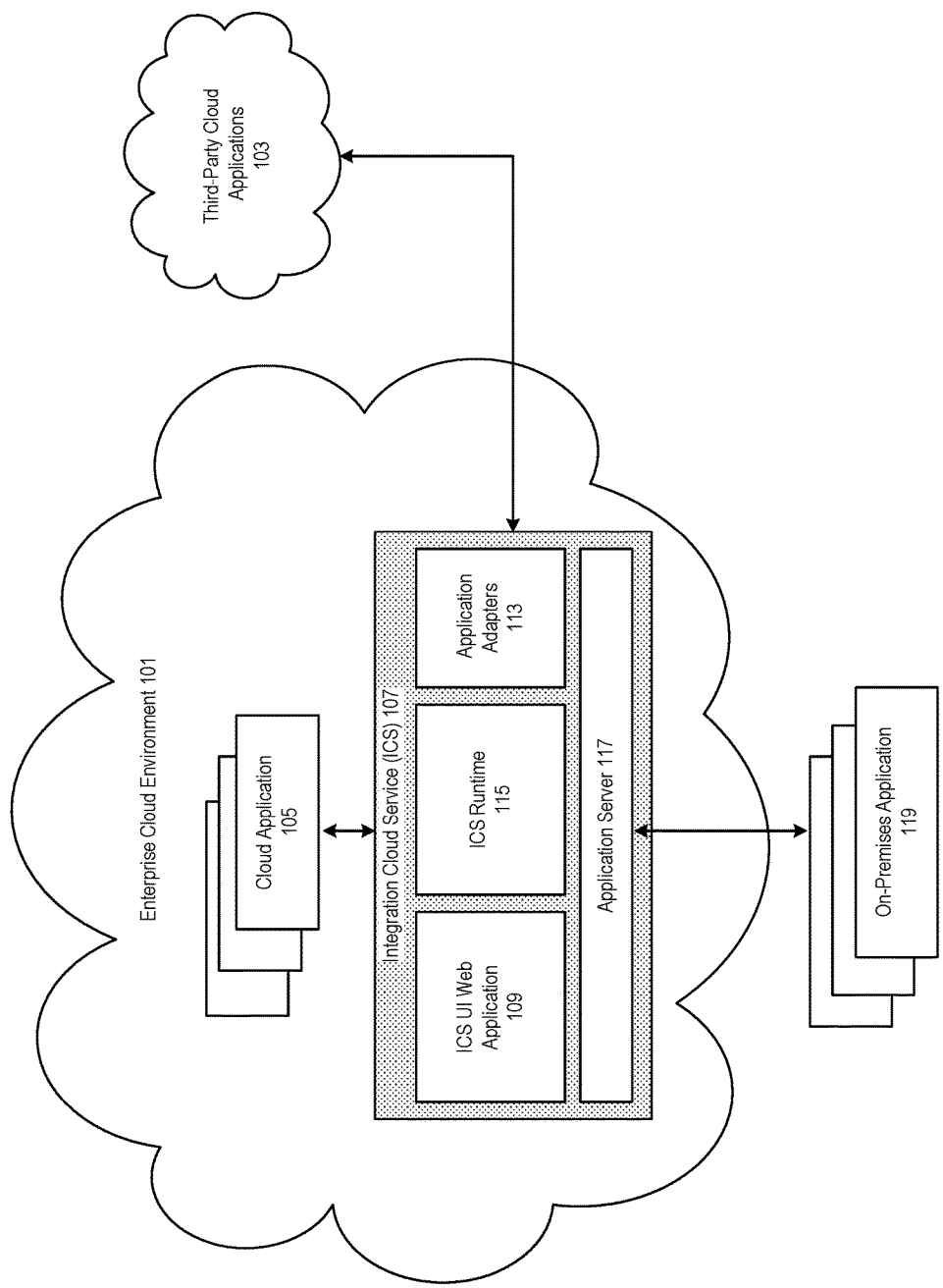
FIG. 1 illustrates an integration cloud service (ICS) in accordance with an embodiment.

FIG. 1 illustrates an integration cloud service in accordance with an embodiment.

As shown in FIG. 1, an ICS 107 can provide a cloud-based integration platform for designing, executing, and managing ICS integration flows. The ICS can include a web application 109 and an ICS runtime 115 executing on an application server 117 in an enterprise cloud environment (for example, Oracle Public Cloud) 101. The web application can provide a design time that exposes a plurality of user interfaces for a developer to design, activate, manage, and monitor an ICS integration flow. An activated ICS integration flow can be deployed and executed on the ICS runtime.

In accordance with an embodiment, a plurality of application adapters 113 can be provided to simplify the task of configuring connections to a plurality of applications, by handling the underlying complexities of connecting to those applications. The applications can include enterprise cloud applications of the ICS vendor (for example, Oracle Right-Now) 105, third-party cloud applications (for example, Salesforce) 103, and on-premises applications 119. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime.

Figure 2:
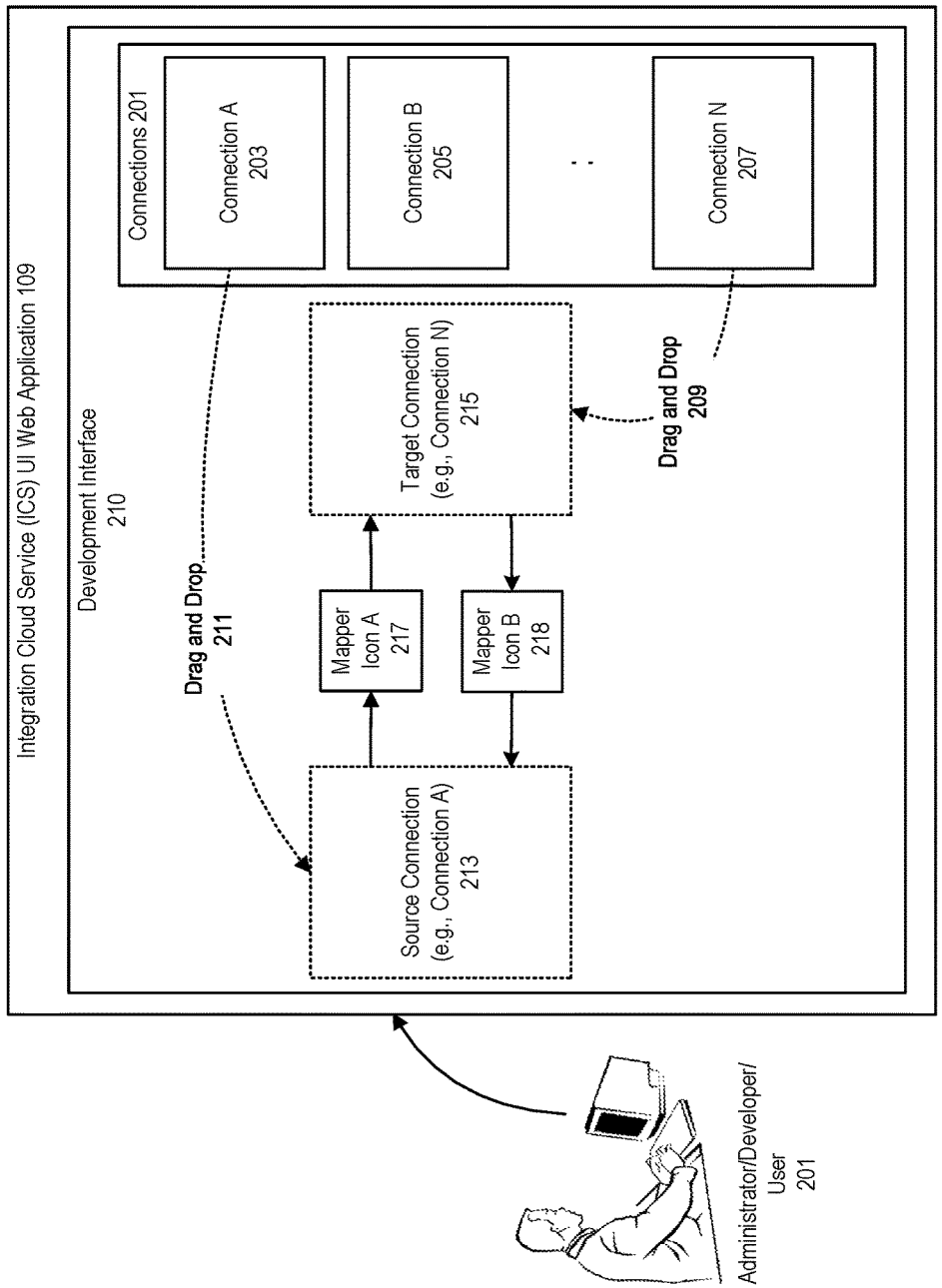
FIG. 2 illustrates an ICS design time in accordance with an embodiment.

FIG. 2 illustrates an ICS design time, in accordance with an embodiment.

In accordance with an embodiment, a development interface (e.g., a development canvas) 210 in the web UI application can be used by a developer to create an ICS integration flow, using a plurality of existing connections 201, for example, connection A 203, connection B 205 and connection N 207.

As shown in FIG. 2, a particular connection (for example, connection A) can be dragged and dropped 211 to the development interface as a source connection 213, and connection N can be dragged and dropped 209 to the development interface as a target connection 215. The source connection can include information required to connect to a source application, and can be used by the ICS to receive requests from the source application (for example, an Oracle RightNow cloud application). The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 217 and mapper icon B 218) can be displayed for use in opening the mappers, so that the developer can define how information is transferred between a source and target data objects for both the request and response messages.

In accordance with an embodiment, the mappers can provide a graphical user interface for the developer to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. A lookup can associate values used by one application for a specific field to the values used by other applications for the same field. This provides the capability to map values across vocabularies or systems.

Graphical Display of Recommendation Mappings

In accordance with an embodiment, the system can graphically display recommended mappings between a source and target object in an ICS design time.

In accordance with an embodiment, a recommendation engine can be used to provide the recommended mappings, each recommended mapping associated with a rating, indicating the reliability or quality of the recommended mapping. A recommended mapping can be displayed with its associated rating for a user to determine whether the recommended mapping can be used. A user can act on a particular mapping to change it into an actual mapping. Different graphical representations (e.g., a solid line and a dotted line) can be used to differentiate an actual mapping and a recommended mapping. The mapper can provide filters to enable displaying mappings based on one or more criteria, including displaying recommend mappings with a required rating.

Figure 3:
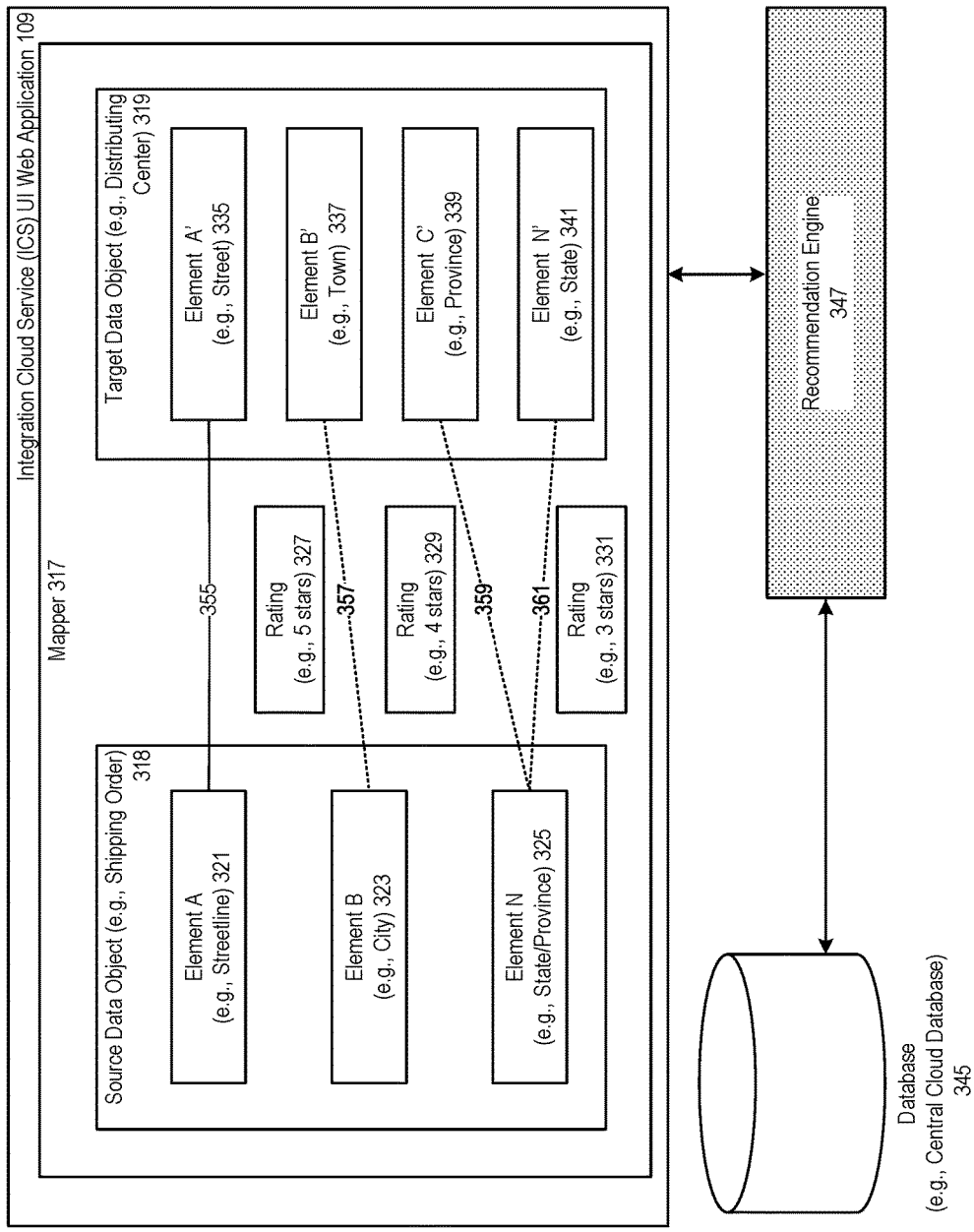
FIG. 3 illustrates a system for graphically displaying recommended mappings in an ICS design time, in accordance with an embodiment.

FIG. 3 illustrates a system for graphically displaying recommended mappings in an ICS design time, in accordance with an embodiment.

As shown in FIG. 3, a mapper 317 can be opened, for example, by clicking on the mapper icon A in the FIG. 2. The opened mapper can display a source data object 318 and a target data object 319. Each data object can represent a data structure (for example, a schema) of a message from a source application or a target application.

In accordance with an embodiment, the source data object can include a plurality of elements/fields (for example, element A 321, element B 323, and element N 325). Similarly, the target data object can include a plurality of elements/fields (for example, element A' 335, element B' 337, element C' 339, and element N'341).

In accordance with an embodiment, when an ICS developer clicks on a recommendation button, a recommendation engine 347 can be invoked to retrieve recommended mappings between the source and target data objects, from a database 345 and/or from another source (for example, a rule-based auto suggestion engine). Each recommended mapping can be graphically displayed between a source element and a target element, with a rating associated with the recommended mapping.

For example, a recommended mapping 357 can be displayed between element B and element B', with a rating (e.g., 5 stars) 327. A recommended mapping 359 can be displayed between element N and element C', with a rating (e.g., 4 stars) 329. A recommended mapping 361 can be displayed between element N and element N', with a rating (e.g., 3 stars) 331.

In accordance with an embodiment, each recommended mapping can be displayed with a different graphical representation (e.g., a dotted line) than a graphic representation (e.g., a solid line) used for displaying an actual mapping 355 between element A and element A'.

In accordance with an embodiment, the mapper allows an ICS developer or a user to toggle between recommended mappings and actual mappings. For example, a filter can be used by the mapper to display only actual mappings or only recommend mappings. The mapper can also allow a user to selectively display recommended mappings that meet one or more criteria, for example, those recommended mappings with a rating of 4 stars or higher, or those recommended mappings contributed by a particular cloud provider.

In accordance with an embodiment, an indicator, for example, a green checkmark icon, can be displayed in the source data object, to indicate that a recommended mapping exists for a particular source element in the source data object. Clicking on the indicator can cause the target data object to scroll, to bring a related target element on a visible page, if the related target element is off the visible page, for example, due to a large size of the target data object.

In case of multiple recommended mappings between one source element to multiple target elements, a recommended mapping with the highest rating (e.g., the highest score) can be displayed first. An ICS developer can flip through the multiple recommended mappings from one to another, filter the multiple recommended mappings using a control, for example, a slider control.

Using Recommended Mappings

In accordance with an embodiment, an ICS developer can view a particular recommended mapping, and determine whether to accept/use the recommended mapping or reject it, based on its associated rating.

In accordance with an embodiment, when an ICS developer can click on a dotted line associated with a recommended mapping, options can be displayed for the developer to accept or reject the recommend mapping. If a particular recommended mapping is accepted, any existing actual mapping between the source and target elements associated with the accepted recommended mapping can be replaced with the accepted mapping. The accepted mapping can become a new actual mapping between the source and target elements.

In accordance with an embodiment, an ICS developer can ignore a recommended mapping, and drag and drop the source element of the recommended mapping to a different target element than the original target element of the recommended mapping.

In accordance with an embodiment, the definition of an accepted mapping can be saved into a file, for example, an extensible stylesheet language (XSL) file, that represents the ICS integration flow being developed or edited. The file can be compiled and deployed to an ICS runtime for execution. The deployment process can cause the actual mappings to be published and populated back into the database through the recommendation engine, to update the ratings associated with the original recommended mappings.

Figure 4:
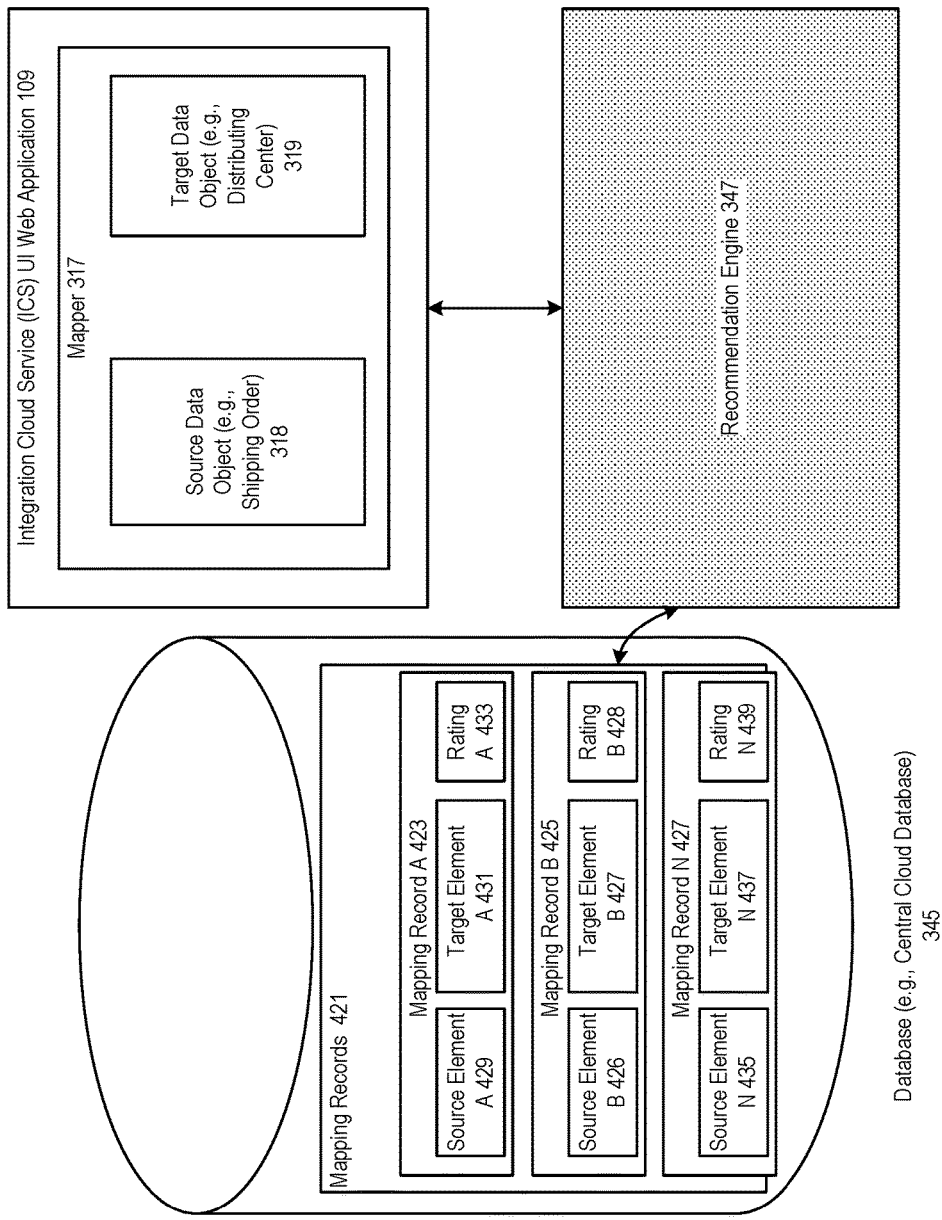
FIG. 4 further illustrates a system for graphically displaying recommended mappings in an ICS design time, in accordance with an embodiment.

FIG. 4 further illustrates a system for graphically displaying recommended mappings in an ICS design time, in accordance with an embodiment.

As shown in FIG. 4, the database can include a plurality of mapping records 421 (for example, mapping record A 423, mapping record B 425, and mapping record N 427). Each mapping record can include a source element (for example, source element A 429, source element B 426, or source element N 435), a target element (target element A 431, target element B 427, or target element N 437), and a rating (for example, rating A 433, rating B 428, or rating N 439).

In accordance with an embodiment, each mapping record can additionally include information specifying a source application and a target application that the source element and the target element pertain to; and a contributor of that mapping record, for example a third party cloud provider, or an ICS developer.

Tables 1 and 2 illustrate a data model for a mapping record in the database, in accordance with an embodiment.

TABLE 1

| Column Name | Type | Required |
|---|---|---|
| SOURCEROOTELEMENTNAMESPACE | VARCHAR2(250) | Y |
| SOURCEROOTELEMENTNAME | VARCHAR2(250) | Y |
| SOURCEELEMENTNAMESPACE | VARCHAR2(250) | Y |
| SOURCEELEMENTNAME | VARCHAR2(250) | Y |
| SOURCEELEMENTPATH | VARCHAR2(2000) | Y |
| SOURCEELEMENTPARENTNODE | VARCHAR2(2000) | Y |
| SOURCEELEMENTUQPATH | VARCHAR2(2000) | Y |
| TARGETROOTELEMENTNAMESPACE | VARCHAR2(250) | Y |
| TARGETROOTELEMENTNAME | VARCHAR2(250) | Y |
| TARGETELEMENTNAMESPACE | VARCHAR2(250) | Y |
| TARGETELEMENTNAME | VARCHAR2(250) | Y |
| TARGETELEMENTPATH | VARCHAR2(2000) | Y |
| TARGETELEMENTPARENTNODE | VARCHAR2(2000) | Y |
| TARGETELEMENTUQPATH | VARCHAR2(2000) | Y |
| SOURCESYSTEM | VARCHAR2(250) | |
| SOURCESYSTEMVERSION | VARCHAR2(250) | |
| SOURCESERVICENAME | VARCHAR2(250) | |
| SOURCESERVICEVERSION | VARCHAR2(250) | |
| SOURCEOPERATIONNAME | VARCHAR2(250) | |
| SOURCETYPE | VARCHAR2(250) | |
| TARGETSYSTEM | VARCHAR2(250) | |
| TARGETSYSTEMVERSION | VARCHAR2(250) | |
| TARGETSERVICENAME | VARCHAR2(250) | |
| TARGETSERVICEVERSION | VARCHAR2(250) | |
| TARGETOPERATIONNAME | VARCHAR2(250) | |
| TARGETTYPE | VARCHAR2(250) | |
| MAPTYPE | VARCHAR2(250) | |
| MAPCONDITIONS | VARCHAR2(250) | |
| MAPCARDINALITY | VARCHAR2(250) | |
| ADDITIONALATTRIBUTES | VARCHAR2(250) | |
| USAGECOUNT | NUMBER(5) | |
| SCORE | NUMBER(5) | |
| MAP_ID | VARCHAR2(50) | Y |
| FUNCTION | VARCHAR2(2000) | |

TABLE 2

| Column Name | Type | Type |
|---|---|---|
| MAP_ID | VARCHAR2(50) | Auto Generated |
| MAPFILEUSER | VARCHAR2(50) | Y |
| MAPFILEUSER | VARCHAR2(250) | Y |
| MAPFILETYPE | VARCHAR2(250) | |

Figure 5:
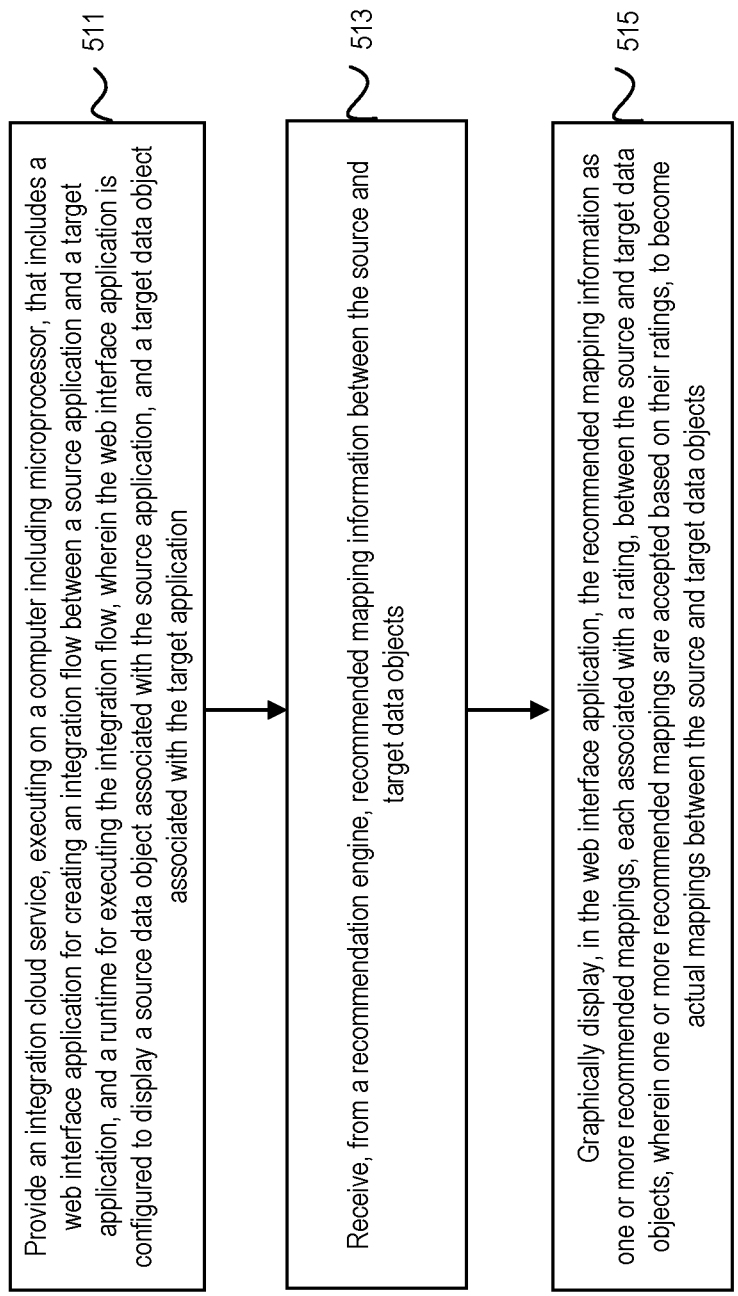
FIG. 5 illustrates a method for graphically displaying recommended mappings in an ICS design time, in accordance with an embodiment.

FIG. 5 illustrates a method for graphically displaying recommended mappings in an ICS design time, in accordance with an embodiment.

As shown in FIG. 5, at step 511, an integration cloud service is provided executing on a computer including a microprocessor, wherein the integration cloud service includes a web interface application for creating an integration flow between a source application and a target application, and a runtime for executing the integration flow, wherein the web interface application is configured to display a source data object associated with the source application, a target data object associated with the target application.

At step 515, the web interface application receives, from a recommendation engine, recommended mapping information between the source and target data objects.

At step 517, the recommended mapping information is graphically displayed as one or more recommended mappings, each associated with a rating, between the source and target data objects, wherein one or more recommended mappings are accepted based on their ratings, to become actual mappings between the source and target data objects.

Recommendation Engine

Figure 6:
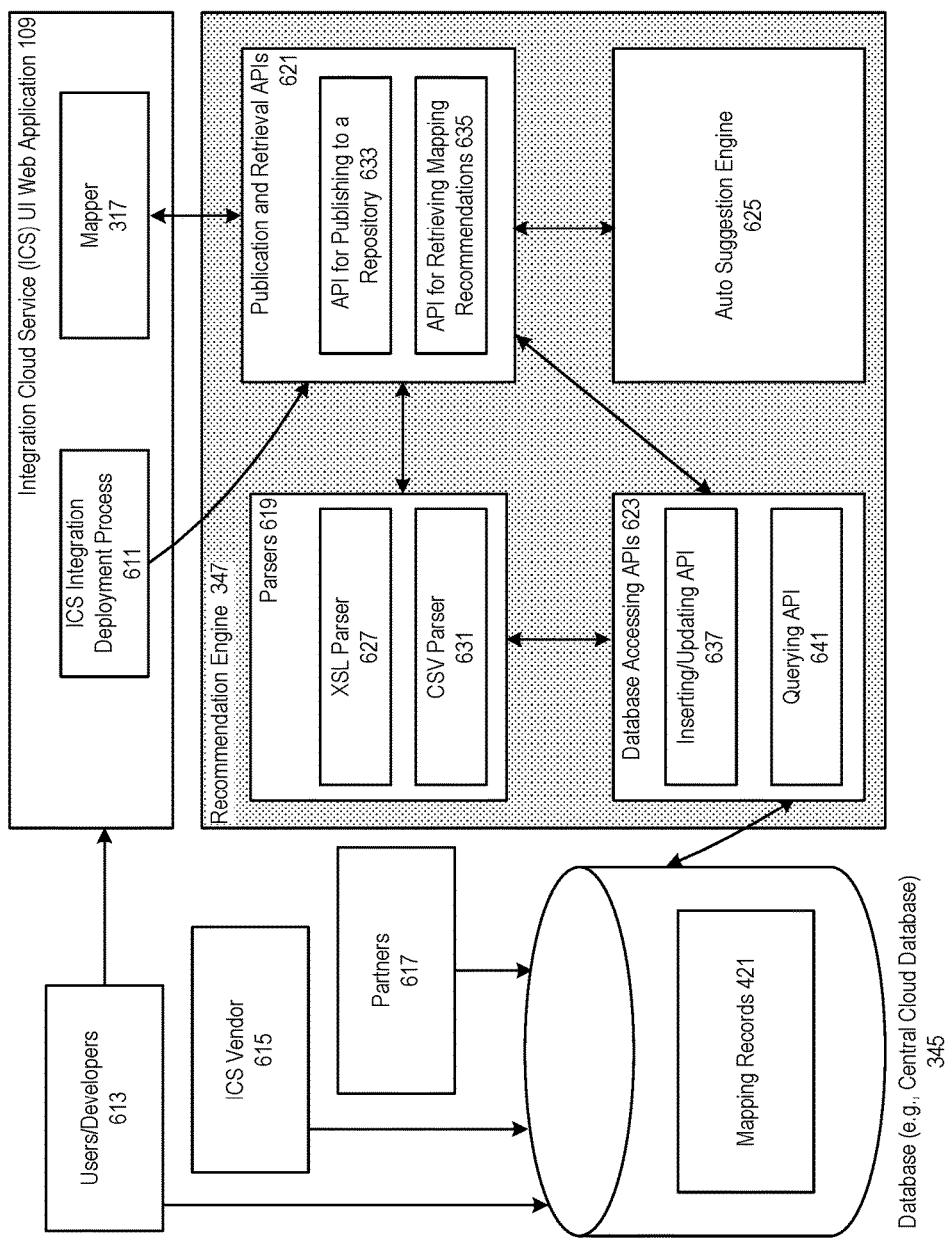
FIG. 6 illustrates a system for providing recommended mappings for use by a mapper in an ICS design time, in accordance with an embodiment.

FIG. 6 illustrates a system for providing recommended mappings for use by a mapper in an ICS design time, in accordance with an embodiment.

As shown in FIG. 6, the system can include the recommendation engine, which further includes publication and retrieval APIs 621 (for example, REST wrappers for Java APIs). The publication and retrieval APIs can comprise an API 633 for publishing to a repository, and an API 635 for retrieving mapping recommendations. The recommendation engine can further include database accessing APIs 623 for use in interacting with the database storing the mapping records. The database accessing APIs can comprise an inserting/updating API 637, and a querying API 641.

In accordance with an embodiment, the API for publishing to a repository can be invoked by an ICS integration deployment process 611, to publish and store mapping records from ICS developers/users 613 to the database. The API for retrieving mapping records can be invoked by the mapper to retrieve recommended mappings from the database using the querying API, and/or from an auto suggestion engine 625.

In accordance with an embodiment, an ICS developer can deploy an ICS integration flow that include mappings created in the mapper, to an ICS runtime, and can choose to publish the ICS integration when deploying it.

In accordance with an embodiment, when the ICS integration flow is being published, the API for publishing to a repository can obtain files representing the ICS integration flow, and provide the files to a parsers component 619 that can extract mapping information from the files. The parsers component can include a plurality of different parsers, for example, an XSL parser 627 and a comma separated values (CSV) parser 631. One or more parsers can be selected based on formats of the files. The parsers component can invoke the inserting/updating API to store the mapping information as one or more mapping records in the database.

As further shown in FIG. 6, the mapping records stored in the database can be from a plurality of different sources, for example, the users/ICS developers 613, an ICS vendor (for example, Oracle) 615, and partners 617. Mapping intelligence/information from these different sources can be persisted into the database differently.

For example, mapping information from pre-built/seeded applications from an ICS vendor can be published and stored to the database using the recommendation engine. Mapping information from a partner can be published to the marketplace, and from the marketplace, the published information can be stored in the database. Mapping information from users of the ICS can be stored into the database using the recommendation engine, or anonymously indexed into the database.

Figure 7:
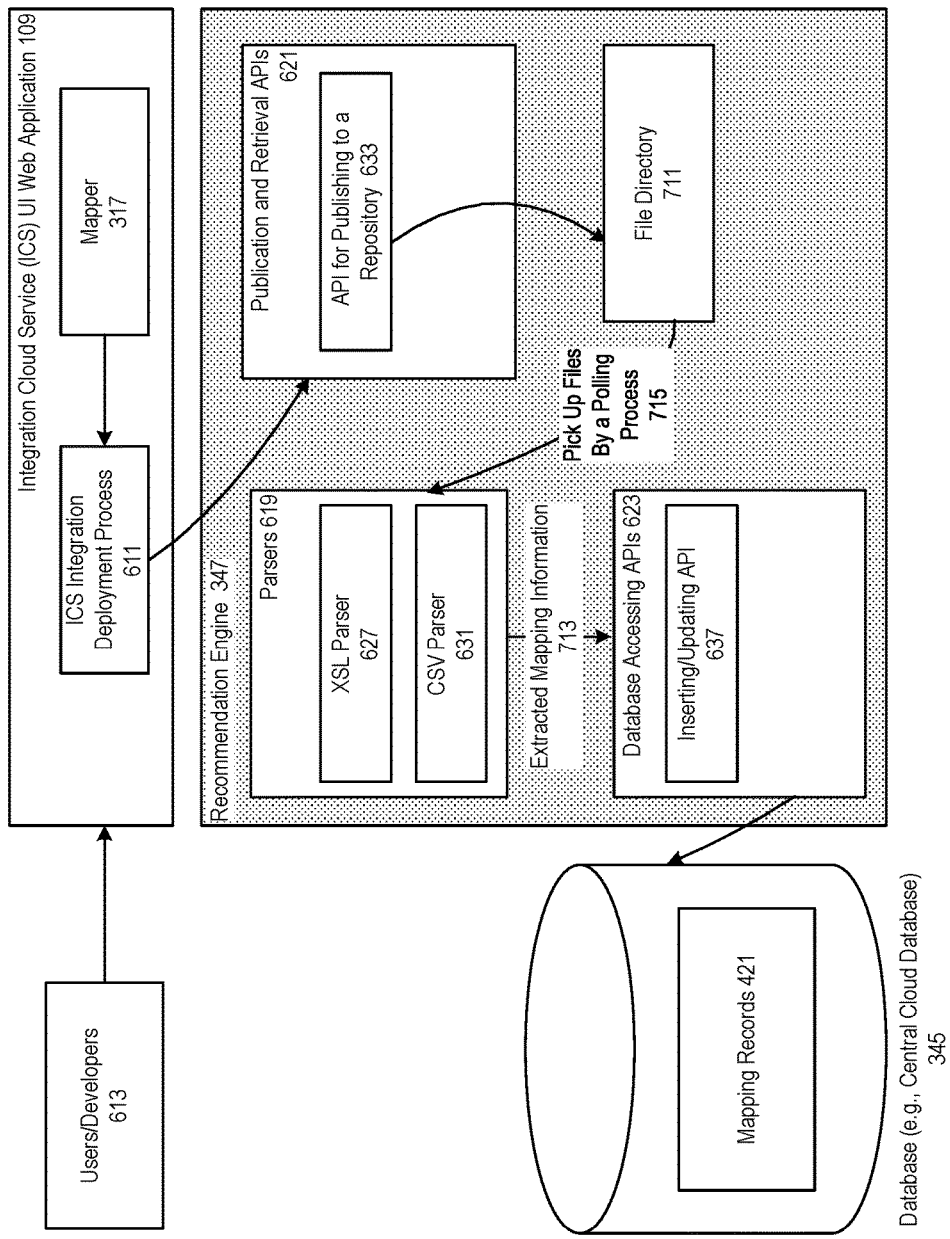
FIG. 7 further illustrates a system for providing recommended mappings for use by a mapper in an ICS design time, in accordance with an embodiment.

FIG. 7 further illustrates a system for providing recommended mappings for use by a mapper in an ICS design time, in accordance with an embodiment.

More particularly, the figure illustrates using the recommendation engine to store mapping information from an ICS integration flow created from the mapper, to the database.

In accordance with an embodiment, when an ICS integration flow is being deployed, the ICS integration deployment process can prompt a user to choose whether to publish the ICS integration flow.

If the user chooses to publish the ICS integration flow, the API for publishing to a repository can obtain files in the ICS integration flow, and drop the files to a designated location (for example, a file directory 711). A daemon process can be used to poll the designed location to pick up 715 the files and provide them to the parsers component. The parsers component can select a parser based on the format of each of the files, and extract mapping information from that file.

In accordance with an embodiment, the parsers component can provide 713 the extracted mapping information 713 to the inserting/updating API, which can insert the extracted mapping information as one or more mapping records to the database, or use the extracted mapping information to update one or more existing mapping records. For example, a usage count or use frequency of an existing mapping record can be increased if the extracted mapping information contains that existing mapping record.

Figure 8:
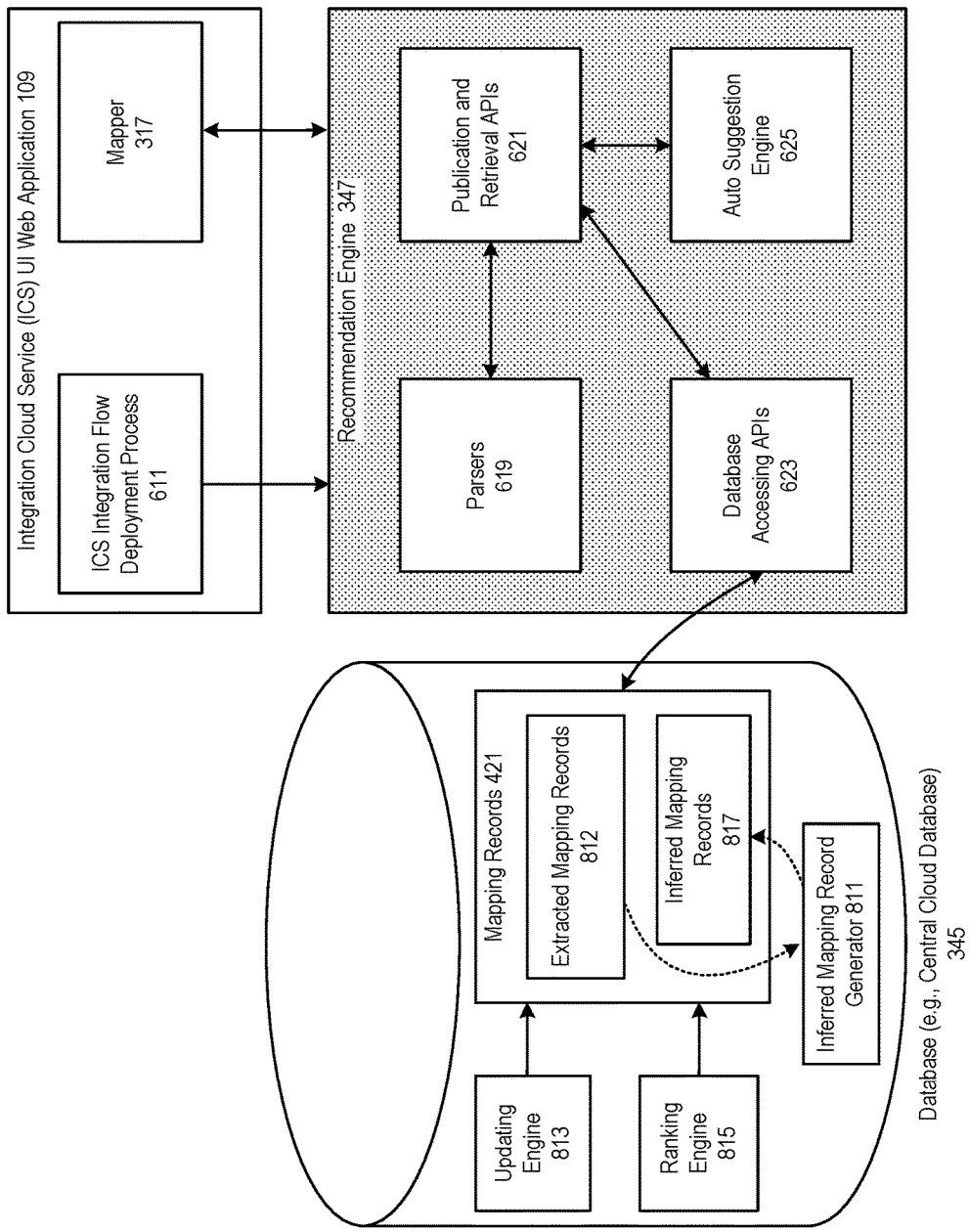
FIG. 8 further illustrates a system for providing recommended mappings for use by a mapper in an ICS design time, in accordance with an embodiment.

FIG. 8 further illustrates a system for providing recommended mappings for use by a mapper in an ICS design time, in accordance with an embodiment.

As shown in FIG. 8, the mapping records in the database can include extracted mapping records 812 from various sources; and mapping records 817 inferred from the extracted mapping records by an inferred mapping record generator 811 using various semantic inference logics.

For example, if the extracted mapping records include a mapping record that maps element E to element F, and a mapping record that maps F to element G, the inferred mapping record generator can generate an additional (inferred) mapping record that maps element E to element G.

In accordance with an embodiment, the inferred mapping record generator can be a daemon process in the database that periodically runs to generate inferred mapping records.

In accordance with an embodiment, each mapping record, either extracted or inferred, can be associated with a rating provided by a ranking engine 815. The ranking engine can generate a rating (for example, a score or number of stars) indicating the reliability or quality of that mapping record.

In accordance with an embodiment, the ranking engine can use a plurality of factors to generate a rating for a mapping record, for example, the source of a mapping record, whether the mapping record is extracted or inferred, number of tenants that have used the mapping record, and a usage count of the mapping record.

In accordance with an embodiment, when a mapping record is inserted into the database, a default rating can be provided based on the source of the mapping record. Each time that the mapping record is used by different tenants, the usage count for the mapping record can be increased.

In accordance with an embodiment, an updating engine 813 can be provided to run periodic jobs, to update the rating of each mapping record, based updated information associated with that mapping record (for example, the updated usage count).

Figure 9:
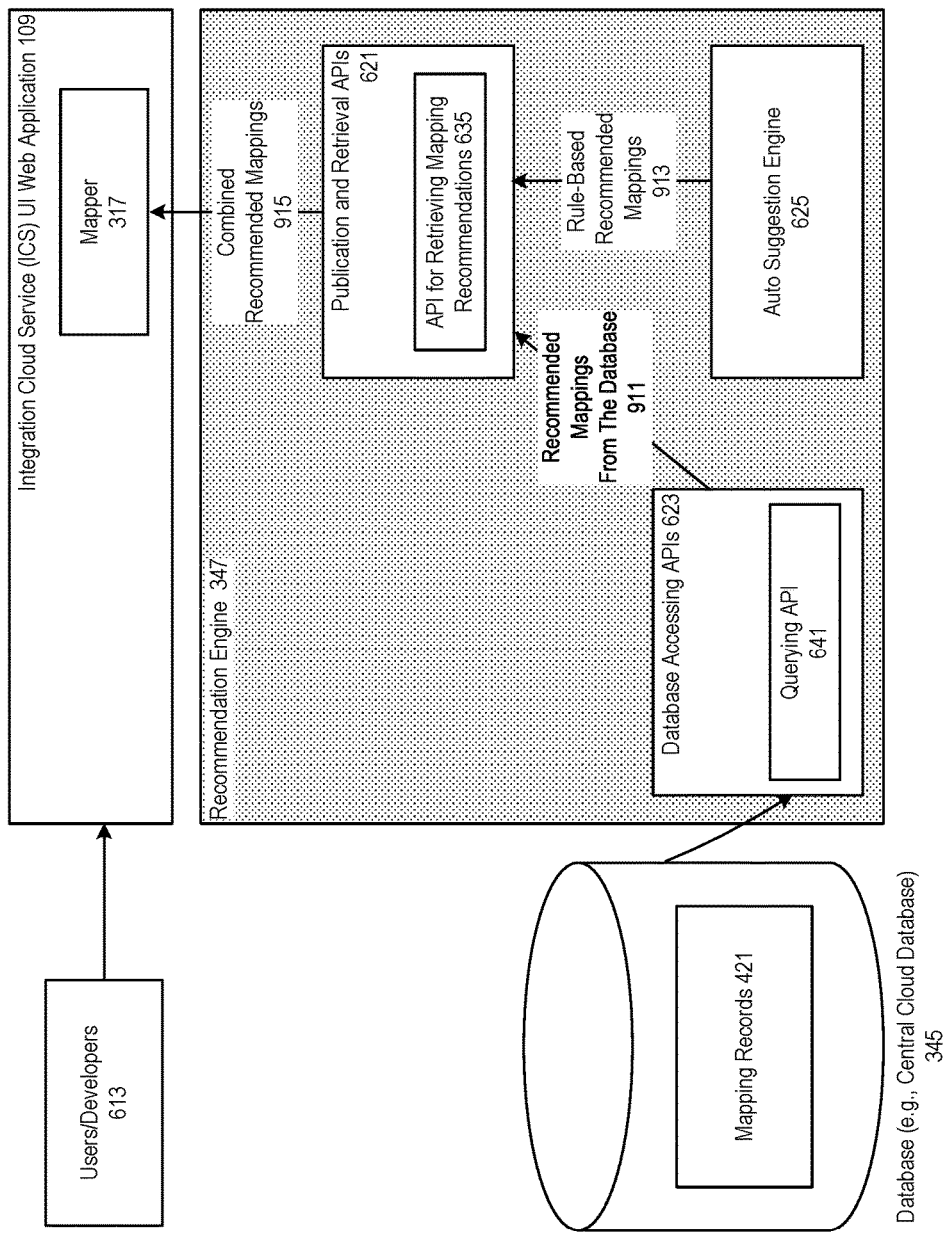
FIG. 9 further illustrates a system for providing recommended mappings for use by a mapper in an ICS design time, in accordance with an embodiment.

FIG. 9 further illustrates a system for providing recommended mappings for use by a mapper in an ICS design time, in accordance with an embodiment.

As shown in FIG. 9, recommended mappings 915 received by the mapper can include recommended mappings 911 from the database, and rule-based recommended mappings 913 from the auto suggestion engine.

In accordance with an embodiment, when the mapper is opened and displays the source and target data objects, a button (for example, a suggestion button) can be provided for the ICS developer to click, to retrieve mapping recommendations from the recommendation engine. The API for retrieving mapping recommendations can be invoked, which in turn can invoke the auto suggestion engine to retrieve rule-based recommended mappings. The auto suggestion engine can inspect the source and target data objects, and provide mapping recommendations in an array back to the API for retrieving mapping recommendations.

In accordance with an embodiment, the auto suggestion engine can generate mapping recommendations based on names of elements in the source and target data objects.

For example, the auto suggestion engine can match elements with exact names or similar names from the source and target data objects.

In accordance with an embodiment, the auto suggestion engine can provide the mapping recommendations to the API for retrieving mapping recommendation. The API can add these mapping recommendations to the mapping recommendations from the database, and send the combined mapping recommendation to the mapper.

In an alternative embodiment, the auto suggestion engine can be invoked only when no mapping recommendation is returned from the database.

Figure 10:
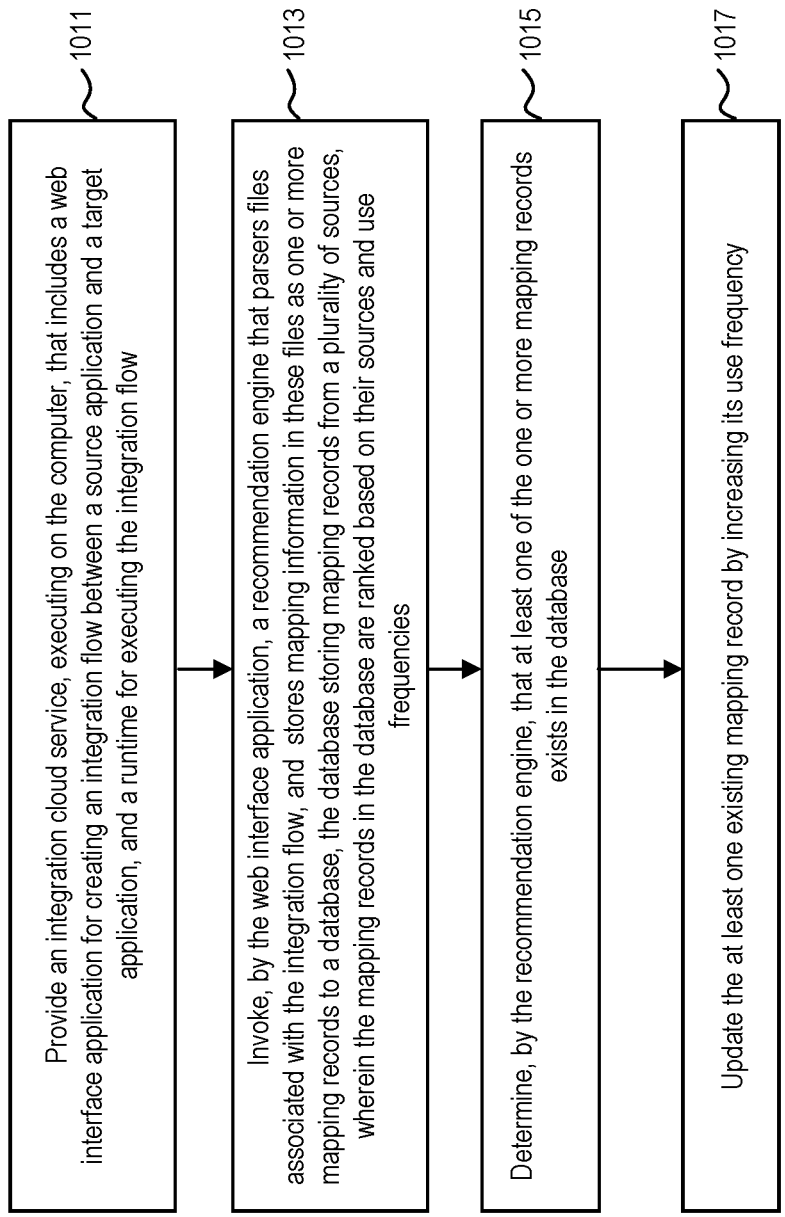
FIG. 10 illustrates a method for providing recommended mappings for use by a mapper in an ICS design time, in accordance with an embodiment.

FIG. 10 illustrates a method for providing recommended mappings for use by a mapper in an ICS design time, in accordance with an embodiment.

As shown in FIG. 10, at step 1011, an integration cloud service is provided on a computer including a microprocessor, wherein the integration cloud service includes a web interface application for creating an integration flow between a source application and a target application, and a runtime for executing the integration flow.

At step 1013, a recommendation engine is invoked to parse files associated with the integration flow, and store mapping information in these files as one or more mapping records to a database, the database storing mapping records from a plurality of sources, wherein the mapping records in the database are ranked based on their sources and use frequencies.

At step 1015, the recommendation engine determines that at least one of the one or more mapping records exists in the database.

At step 1017, the recommendation engine updates the at least one existing mapping record by increasing its use frequency.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing recommended mappings for use in a cloud-based integration service, comprising:
   a computer comprising one or more microprocessors;
   a cloud service, executing on the computer, wherein the cloud service comprises:
     a web interface application for creating an integration flow between a source application and a target application, the integration flow using an actual mapping between the source and target applications stored in a database; and
     a runtime for executing the integration flow; and
   a recommendation engine that is configured to parse files associated with the integration flow, and to store mapping information of the files associated with the integration flow as one or more parsed mapping records to the database, wherein the database stores one or more other mapping records from a plurality of sources associated with the system, wherein each of the one or more parsed and the one or more other mapping records are stored in the database associated with a rating based on their respective sources and use frequencies,
   wherein the recommendation engine, when storing the one or more parsed mapping records to the database, operates to determine that a particular parsed mapping record to be stored exists in the database, and to update the particular parsed mapping record in the database by increasing its use frequency,
   wherein the recommendation engine presents a recommended mapping between the source and target applications and a rating of the recommended mapping,
   wherein the recommendation engine replaces the actual mapping between the source and target applications in the database with the recommended mapping as a new actual mapping between the source and target applications based on an acceptance of the recommended mapping.

2. The system of claim 1, wherein the recommendation engine comprises one or more application programming interfaces operable to interact with the database, and one or more parsers operable to parse the files associated with the integration flow.

3. The system of claim 1, wherein the web interface application is configured to display:
   a source data object associated with the source application and including one or more source elements;
   a target data object associated with the target application and including one or more target elements;
   the actual mapping between the source and target applications using a first display format; and
   the recommended mapping between the source and target applications using a second display format different than the first display format.

4. The system of claim 1, wherein the recommendation engine retrieves the presented recommended mapping information between the source and target data objects from the database.

5. The system of claim 1, wherein:
   the recommendation engine further comprises an auto suggestion engine that generates one or more auto-recommended mappings based on a name match between elements of the source data object and the target data object;

the web interface application displays the one or more auto-recommended mappings generated by the auto suggestion engine graphically between the source data object and the target data object as the recommended mapping.

6. The system of claim 1, wherein the database is configured to receive the one or more other mapping records from a plurality of sources comprising one or more developers, and one or more third-party companies that published their mapping information.

7. The system of claim 1, further comprising:
an inferred mapping record generator comprising a daemon process in the database, the daemon process periodically executing to generate one or more mapping records inferred from the plurality of mapping records extracted from the plurality of sources,
wherein the database stores the one or more mapping records inferred from the plurality of mapping records extracted from the plurality of sources.

8. The system of claim 7, wherein the database comprises:
a ranking engine that operating to generate the rating for each mapping record; and
a mapping record generator that operable to generate the one or more inferred mapping records using semantic inference logics.

9. A method for providing recommended mappings for use by a cloud-based integration service, comprising:
providing a cloud service, executing on the computer comprising one or more microprocessors, wherein the cloud service comprises:
a web interface application for creating an integration flow between a source application and a target application, the integration flow using an actual mapping between the source and target applications stored in a database; and
a runtime for executing the integration flow;
invoking, by the web interface application, a recommendation engine that parses files associated with the integration flow, and stores mapping information of the files associated with the integration flow as one or more mapping records to a database, wherein the database stores one or more other mapping records from a plurality of sources associated with the system, wherein each of the one or more parsed and the one or more other mapping records are stored in the database associated with a rating based on their sources and use frequencies;
determining, by the recommendation engine, that a particular parsed mapping record to be stored exists in the database;
updating the particular parsed mapping record in the database by increasing its use frequency;
presenting by the recommendation engine a recommended mapping between the source and target applications and a rating of the recommended mapping; and
replacing by the recommendation engine the actual mapping between the source and target applications in the database with the recommended mapping as a new actual mapping between the source and target applications based on an acceptance of the recommended mapping.

10. The method of claim 9, wherein the recommendation engine comprises one or more application programming interfaces operable to interact with the database, and one or more parsers operable to parse the files associated with the integration flow.

11. The system of claim 9, wherein the web interface application is configured to display:
a source data object associated with the source application and including one or more source elements;
a target data object associated with the target application and including one or more target elements:
the actual mapping between the source and target applications using a first display format; and
the recommended mapping between the source and target applications using a second display format different than the first display format.

12. The method of claim 9, wherein the recommendation engine retrieves the presented recommended mapping information between the source and target data objects from the database.

13. The method of claim 12, wherein the recommendation engine further comprises an auto suggestion engine that generates recommended mappings based on a name match between elements of the source data object and the target data object;
the web interface application displays the one or more auto-recommended mappings generated by the auto suggestion engine graphically between the source data object and the target data object as the recommended mapping.

14. The method of claim 9, wherein the database is configured to receive the one or more other mapping records from a plurality of sources comprising one or more developers, and one or more third-party companies that published their mapping information.

15. The method of claim 9, further comprising:
periodically executing a daemon process to generate one or more mapping records inferred from the plurality of mapping records extracted from the plurality of sources,
wherein the database comprises one or more mapping records inferred from the plurality of mapping records extracted from the plurality of sources.

16. The method of claim 15, further comprising:
operating a ranking engine to generate the rating for each mapping record; and
operating a mapping record generator to generate the one or more inferred mapping records using semantic inference logics.

17. A non-transitory computer-readable storage medium storing a set of instructions for providing recommended mappings for use by an integration cloud service, said instructions, when executed by one or more processors, causing the one or more processors to perform the steps comprising:
providing a cloud service, executing on the computer, wherein the cloud service comprises:
a web interface application for creating an integration flow between a source application and a target application, the integration flow using an actual mapping between the source and target applications stored in a database; and
a runtime for executing the integration flow;
invoking, by the web interface application, a recommendation engine that parses files associated with the integration flow, and stores mapping information of the files associated with the integration flow as one or more mapping records to a database, wherein the database stores one or more other mapping records from a plurality of sources associated with the system, wherein each of the one or more parsed and the one or more other mapping records are stored in the database associated with a rating based on their sources and use frequencies;

determining, by the recommendation engine, that a particular parsed mapping record to be stored exists in the database;

updating the particular parsed mapping record in the database by increasing its use frequency;

presenting by the recommendation engine a recommended mapping between the source and target applications and a rating of the recommended mapping; and replacing by the recommendation engine the actual mapping between the source and target applications in the database with the recommended mapping as a new actual mapping between the source and target applications based on an acceptance of the recommended mapping.

18. The non-transitory computer-readable storage medium of claim 17, wherein the recommendation engine comprises one or more application programming interfaces operable to interact with the database, and one or more parsers operable to parse the files associated with the integration flow.

19. The non-transitory computer-readable storage medium of claim 17, wherein the web interface application is configured to display:
   a source data object associated with the source application and including one or more source elements;
   a target data object associated with the target application and including one or more target elements;
   the actual mapping between the source and target applications using a first display format; and
   the recommended mapping between the source and target applications using a second display format different than the first display format.

20. The A non-transitory computer-readable storage medium of claim 17, wherein the web interface application operates to retrieve from the recommendation engine recommended mapping information between the source and target data objects.

* * * * *